United States Patent

[11] 3,602,553

| [72] | Inventors | James C. Cumming<br>25 Woodside Park, Pleasant Ridge, Mich. 48069;<br>James C. Neisch, 31312 Fairfield Avenue, Warren, Mich. 48093 |
|---|---|---|
| [21] | Appl. No. | 41,765 |
| [22] | Filed | June 4, 1970 |
| [45] | Patented | Aug. 31, 1971<br>Continuation of application Ser. No. 866,152, Oct. 10, 1969, abandoned, which is a continuation of application Ser. No. 662,448, Aug. 22, 1967, now abandoned. |

[54] BRAKE SYSTEM
12 Claims, 5 Drawing Figs.

[52] U.S. Cl. .................................................... 303/21 EB,
188/181 C, 303/20, 317/5, 324/161, 340/263
[51] Int. Cl. .................................................... B60t 8/08,
B60t 8/10
[50] Field of Search .......................................... 188/181;
303/20, 21, 6, 24; 317/5; 318/52; 324/161;
340/52, 263

[56] References Cited
UNITED STATES PATENTS

| 2,914,359 | 11/1959 | Yarber .......................... | 303/21 BE |
| 3,066,988 | 12/1962 | McRae ......................... | 303/21 CG UX |
| 3,260,555 | 7/1966 | Packer .......................... | 303/21 BB |
| 3,286,734 | 11/1966 | Hartshorne ................... | 303/21 F X |
| 3,467,444 | 9/1969 | Leiber .......................... | 303/21 B |
| 3,495,880 | 2/1970 | Gratsch ........................ | 188/181 A X |
| 3,503,654 | 3/1970 | Stamm ......................... | 303/21 EB |

Primary Examiner—Milton Buchler
Assistant Examiner—Stephen G. Kunin
Attorneys—John R. Bronaugh, Floyd S. Levison, Dennis O'Conner and Richard A. Speer ABSTRACT: An automotive braking system in which the rotational velocity of certain wheels, usually the front wheels, provides a reference for comparison with the rotational velocity of the other wheels to provide a signal to limit the braking effort at said other wheels to a value just below that which will cause said other wheels to lock up except when said front wheels are first locked.

PATENTED AUG 31 1971   3,602,553

INVENTORS
James C. Cumming
James C. Neisch

BY Strauch, Nolan, Neale, Nies & Kurz
ATTORNEYS

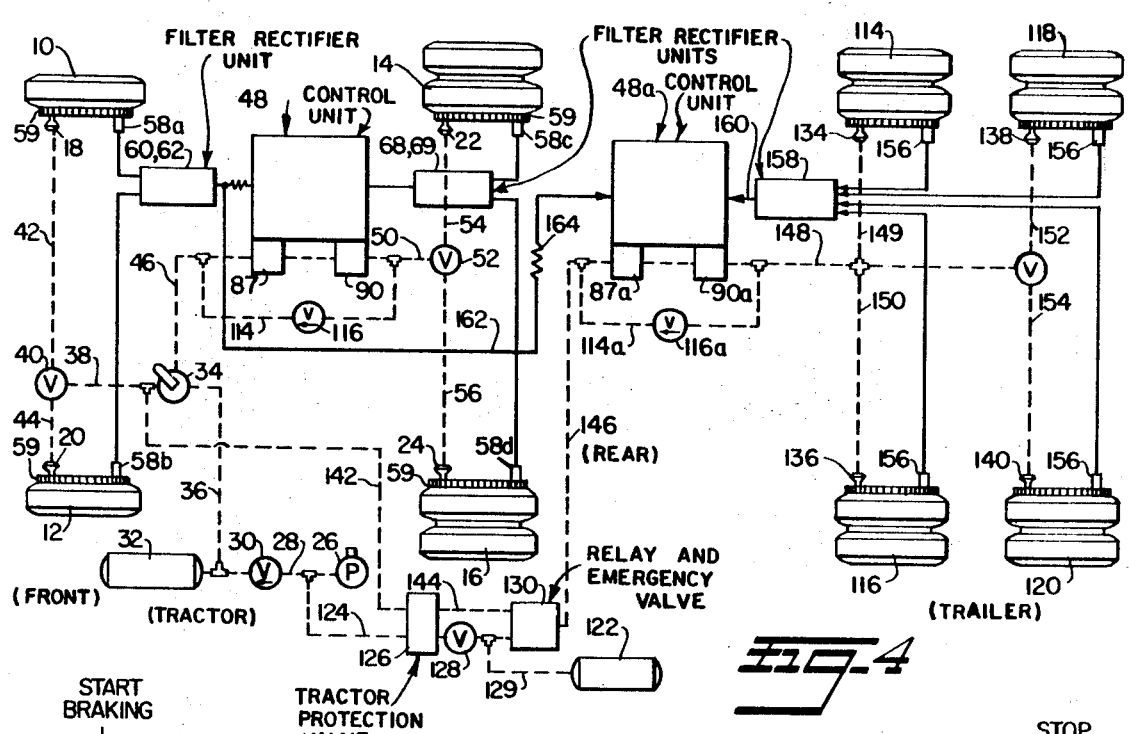
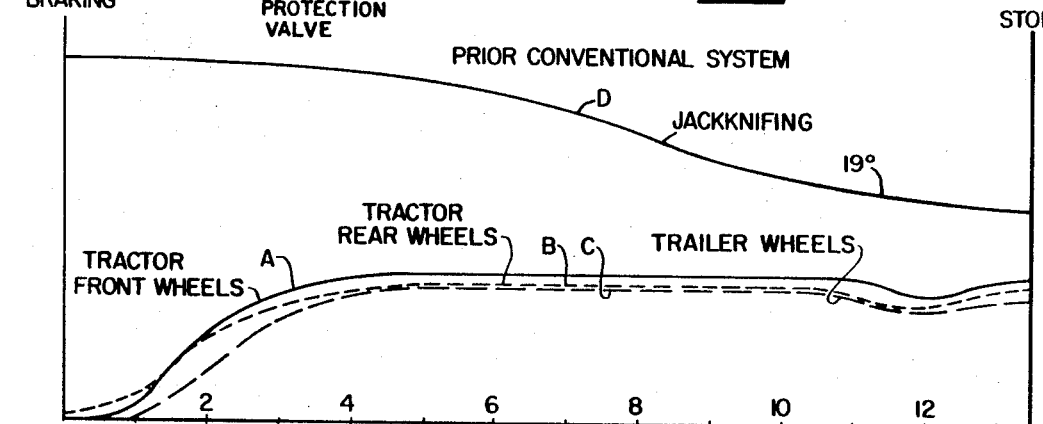
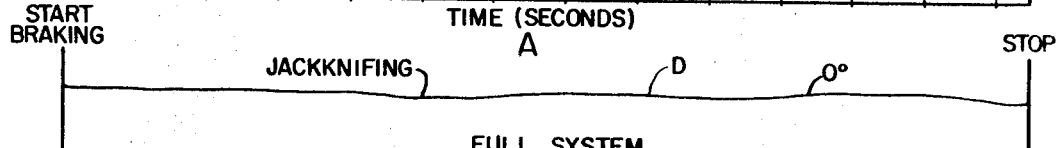
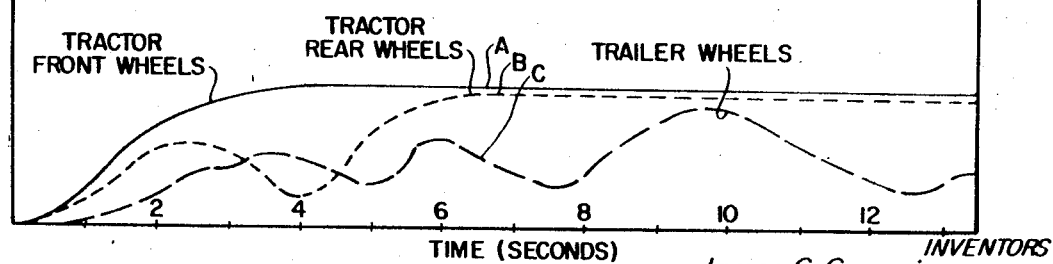

BRAKE SYSTEM

This application is a continuation of applicant's copending application Ser. No. 886,152 filed Oct. 10, 1969 for Brake System which in turn is a continuation of Ser. No. 662,448 filed Aug. 22, 1967 for Brake System and now abandoned.

BACKGROUND OF THE INVENTION

It is well known in the art that a brake application which is excessive for a given road-tire adhesion coefficient and for the instantaneous dynamic wheel load distribution of the vehicle will result in locking some or all of the wheels of the vehicle causing the vehicle to become directionally unstable. Rear wheel lock will create an oversteer condition often resulting in a spin whereas front wheel lock causes loss of steering control. In situations where all of the wheels lock, with the rear wheels locking first, an unpredictable slide is often produced. However, all wheel lock, where the front wheels lock before the rear wheels, produces only a loss of steering control with the vehicle continuing to travel on a straight line. The problem is complicated in articulated commercial vehicles since rear wheel lock creates severe jackknifing in addition to making the vehicle directionally unstable.

It is also generally recognized that minimum stopping distances with minimum loss of directional stability and control are achieved when the braking force is slightly less than the value which will cause any of the wheels to lock. There have been several prior attempts to produce a brake control achieving this objective, but none have been wholly successful nor dependable in operation. For example, it has been proposed to provide means responsive to a wheel lock condition to lower the brake pressure supplied to the locking wheel or wheel set. However, this system is objectionable since it first permits a dangerous situation to develop and then corrects it, and, in the corrective action, produces a jerky or uneven braking action. Systems have also been proposed in which incipient wheel lock is detected and wheel lock is prevented by pulsing the brake pressure delivered to the wheel which is about to lock. This control system materially reduces the effective braking action of one or more of the wheels and materially increases the stopping distance. Thus, the net effect of many prior systems is to provide directional stability only at the expense of materially increased stopping distance. In many emergency situations this result may be disastrous.

In addition, where the rapid pulsing of the brake pressure is affected in an air brake system, the air reservoir may be severely depleted with the result that there may be insufficient air to properly accomplish a series of heavy braking operations in close sequence.

SUMMARY OF THE INVENTION

With the foregoing considerations in mind the present invention contemplates an improved antiskid brake system which overcomes the foregoing major disadvantages, one or more of which is associated with each of the known prior art systems. Specifically, the present invention eliminates the increased stopping distance, the jerky violent stops, the excessive loss of pressurized air in airbrake systems, the inability to distinguish between front wheel lock and rear wheel lock, and the inability to permit normal braking operations, i.e. under conditions where there is no tendency toward wheel lock, to be accomplished under the direct control of the vehicle operator.

Accordingly, it is a major object of the present invention to provide an improved brake control system which permits normal operation of all of the brakes under moderate braking loads and, under heavier braking loads, detects minor and major tendencies of the rear wheels to lock and to hold the braking effort constant when the minor tendency is detected and to reduce the braking effort when the major tendency is detected, thus preventing rear wheel lock while applying maximum braking effort just below a level at which wheel lock will occur.

It is a further object of the present invention to provide improved brake control systems which at all times permit full braking pressure to be developed at the front wheels of a vehicle, but maintains the braking effort at the rear wheels at a level just below that which will establish wheel lock except when the front wheels lock.

It is also an object of the present invention to provide improved brake control systems which, when adapted to an air brake system, are operable to prevent rear wheel lock without causing excessive depletion of the pressurized air in the air reservoir.

It is an additional object of the present invention to provide improved brake control systems which prevent the jackknifing of articulated vehicles without materially increasing the stopping distance by preventing the rear wheels from locking except when the front wheels lock.

In attaining these and other objects, the present invention provides an electrical-mechanical system which effectively compares the rotational velocity of the front vehicle wheels with the rotational velocity of the other wheels or wheel sets. When a relative decrease in the rotational velocity of the rear wheels is detected indicating a tendency of the rear wheels to lock, a "hold" circuit is actuated which maintains the braking effort at the rear wheels constant. This hold circuit is actuated only so long as the tendency of the rear wheels to lock remains essentially constant. If this tendency is eliminated, the hold circuit is deactuated and normal operation of the brake is resumed under direct control of the operator. If, however, the tendency of the rear wheels to lock is increased, as indicated by a further reduction in the rotational velocity of the rear wheels, a bleed circuit is actuated to reduce the braking effort at the rear wheels until the increased tendency of the rear wheels to lock is eliminated. Since both the hold circuit and the bleed circuit are actuated only when the rotational velocity of the rear wheels is less than the rotational velocity of the front wheels neither circuit is actuated when the front wheels are locked, thus permitting the development of full braking pressure at the rear wheels to lock the rear wheels but only after the front wheels are locked.

Additional objects and advantages of the present invention will become apparent as the description proceeds in connection with the drawings described below.

DRAWINGS

FIG. 4 is a schematic illustration of a second embodiment of the brake system of the present invention, particularly adapted for installation on a vehicle having more than a single set of wheels rearward of the front axle; and FIG. 5 includes two charts comparing the braking performance and jackknifing of an articulated vehicle with and without the improved system of the present invention.

DESCRIPTION OF PREFERRED EMBODIMENTS

Figure 1:
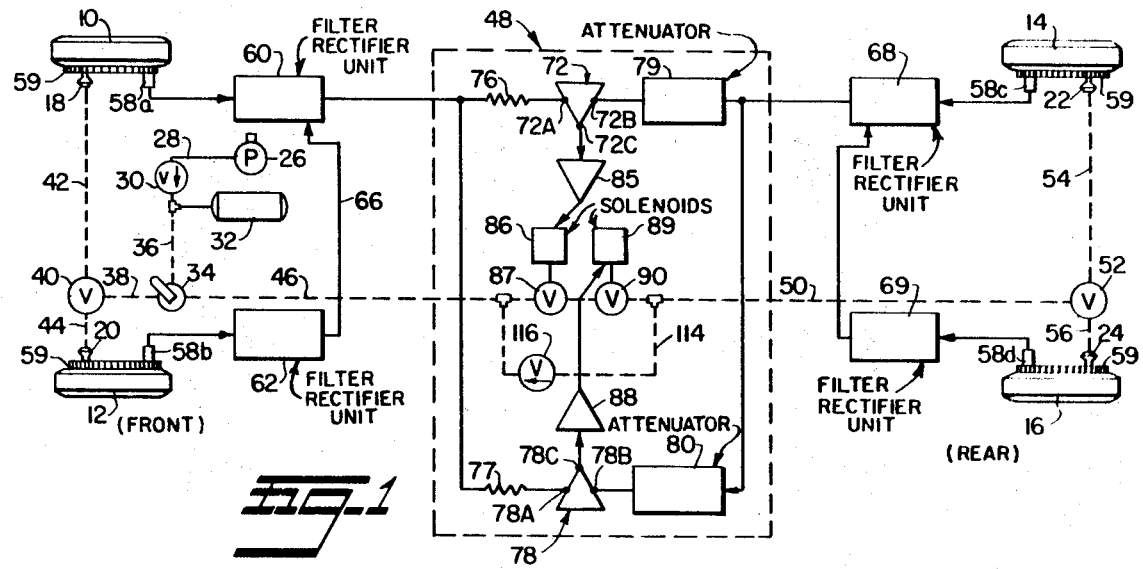
FIG. 1 is a schematic illustration of an improved brake control system constructed in accordance with the present invention particularly adapted for installation on a four-wheel vehicle.
Figure 2:
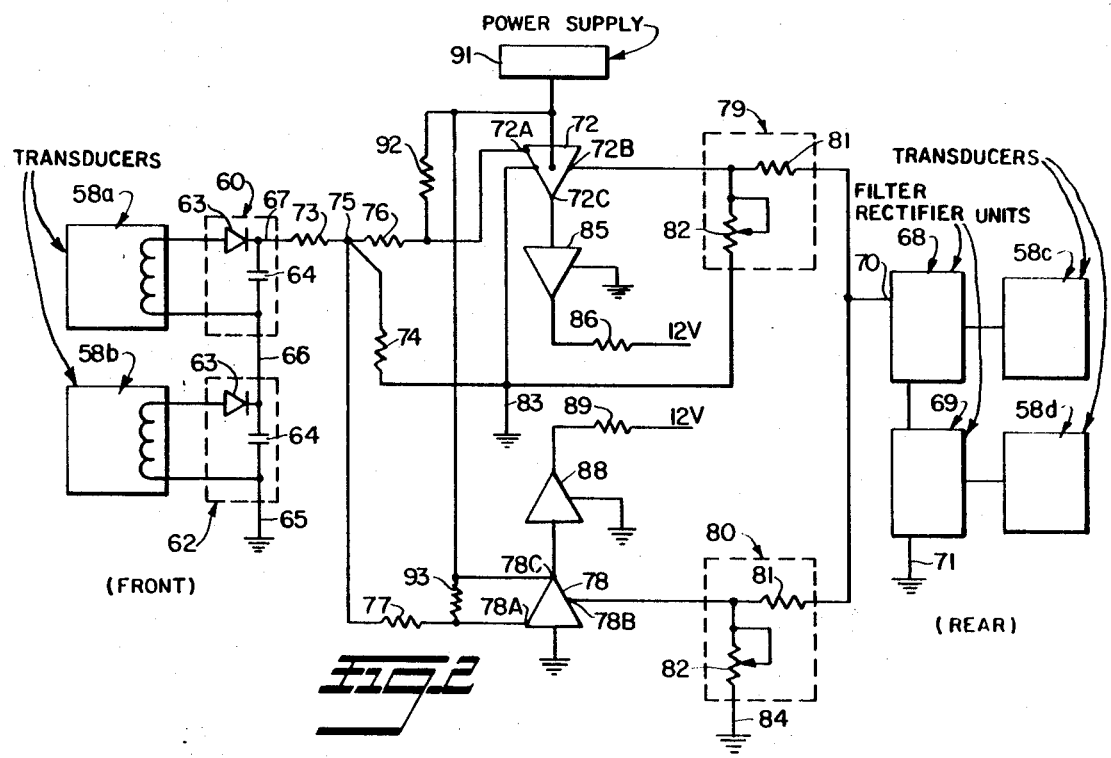
FIG. 2 is a more detailed diagram of the electrical circuit of the control system of FIG. 1.
Figure 3:
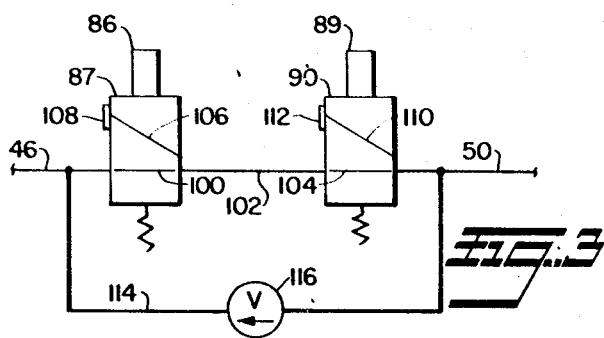
FIG. 3 is a detailed schematic view of certain of the mechanical components of the system of FIG. 1.

Referring now more particularly to the drawings and especially to FIGS. 1, 2, and 3, the system as shown is particularly adapted for a passenger vehicle or a light truck having front wheels 10 and 12 and rear wheels 14 and 16. The wheels 10-16 are equipped, respectively, with conventional air brake mechanisms 18, 20, 22 and 24.

The usual engine driven compressor 26 delivers pressurized air through conduit 28, and a check valve 30 to a reservoir 32 connected to the inlet side of the usual foot-operated brake application valve 34 through a conduit 36. When the valve 34 is operated, air under pressure is supplied through conduit 38, valve 40 and conduits 42 and 44 to actuate the front wheel brakes 18 and 20. Compressed air is also simultaneously delivered through conduit 46 to the control unit 48, described in detail below, and through the control unit to conduit 50, quick release valve 52, and conduits 54 and 56 to the brake mechanisms 22 and 24 for the rear wheels 14 and 16. Under normal, moderate braking conditions the control unit 48 has no effect on the system and the pressure delivered to the conduit 46 is supplied without modification to the rear wheel brakes.

Each of the vehicle wheels is equipped with a mechanism for detecting the rotational velocity of the wheel. Preferably these units are identical and each comprises an electromagnetic pickup transducer designated 58a, 58b, 58c and 58d, respectively, and each having a permanent magnet core pole piece facing the associated wheel brake drum which is provided with a series of circumferentially uniformly spaced magnetic elements which may comprise a series of notches and teeth 59 of a magnet material such as iron or steel. As the discontinuous magnetic element (formed by these notches and teeth) presented by the drum face rotates in the field of the pole piece to vary the flux density, an essentially sinusoidal voltage is generated, the frequency and pulse width of which are directly proportional to the rotary velocity of the wheel. Thus each transducer generates a signal which is indicative of the rotational velocity of the associated wheel.

The front wheel transducers 58a and b are respectively connected to combination rectifier and filter networks 60 and 62 which produce at their outputs two continuous direct current voltages proportional in amplitude respectively to the rotational velocities of the front wheels 10 and 12. The networks 60 and 62 are of identical construction and each comprise a diode 63 and a capacitor 64 as shown in FIG. 2. One terminal of the network 62 is connected to ground at 65. A common connection 66 is made between the units 60 and 62 in such a manner as to add the filtered direct current voltage output of the two front wheel rectifier networks 60 and 62, the total voltage appearing between the ground 65 and terminal 67 of the network 60.

The rear wheel transducers 58c and 58d are similarly connected to the rectifier and filter networks 68 and 69, the total direct current voltage output of the two rear wheel networks appearing between the output terminal 70 and ground 71.

The combined output signal of the two front wheel transducers 58a and 58b is bed to a differential comparator 72 through a voltage divider comprising resistors 73 and 74 with a tap point 75 between them. An isolation resistor 76 is disposed between the tap point 75 and terminal 72A of the compensator 72. Similarly, a second isolation resistor 77 is disposed between the tap point 75 and terminal 78A of a second differential comparator 78. The combined voltage output, which is indicative of the rear wheel rotational velocity, is fed to the differential comparator 72 through a variable attenuator 79 and to the differential comparator 78 through a variable attenuator 80. The attenuators 79 and 80 may be of identical construction and each comprises a fixed resistor 81 and a variable resistor 82. One terminal of the attenuator 79 is connected to ground at 83 which also grounds the differential comparator 72 and one terminal of the resistor 74. The corresponding terminal of the attenuator 80 is also grounded at 84.

The two attenuators are in effect voltage dividers with a potential drop across the resistor 82 being capable of manual variation to determine the magnitude of the voltage drop appearing across the associated differential comparator.

The voltage drop appearing across the terminals of the comparator 72 is essentially the voltage drop across the resistor 74 as the isolation resistor 76 is sized to produce a negligible drop across itself under normal operating conditions.

The comparators 72 and 78 are of conventional construction and, for example, may be monolithic devices constructed on a single silicon ship such as, for example, the type disclosed in U.S. Pats. No. 2,981,877; 3,025,589; 3,064,167; 3,108,359, and 3,177,260.

It is the function of the comparator 72 to compare the voltage levels at terminals 72A and 72B and to produce a specific control signal only when the voltage level at terminal 72B is less than that at terminal 72A by a predetermined amount. Similarly, the second comparator 78 will generate a direct current voltage output signal when the voltage impressed on the terminal 78B is more negative than the voltage impressed on the terminal 78A by a predetermined amount. In a specific example the comparators will each generate a −0.5 volt output signal unless the voltage impressed at the terminal B is negative with respect to the voltage impressed on the terminal A by more than four millivolts. When this differential across the terminals of the comparators is generated, the comparators will develop a direct current output signal at terminal C having a magnitude of three volts. The three volt output signal of the comparator 72 triggers a power amplifier 85 of conventional design which energizes a solenoid 86 to actuate a "hold" valve 87, the operation of which will be described below. Similarly the three volt control signal generated by the comparator 78 triggers a power amplifier 88 which energizes the solenoid 89 of a bleed valve 90 also described below.

A 12 volt power supply, which ordinarily will be provided from the vehicle battery is connected to the comparators, to the power amplifiers, and to one side of each of the valve solenoids, the other side of the solenoids being connected to the output terminals of the power amplifiers. A −3.9 volt power supply 91 is also provided to supplement the vehicle battery as the full voltage operating range of the comparator is approximately 15.9 volts. Resistors 92 and 93 are provided to insure that the comparators turn off under certain predetermined conditions.

From the description thus far it will be apparent that when all of the vehicle wheels are traveling at essentially the same speed the voltage differential impressed on the terminals of the comparators is below the predetermined amount and the comparators each generate a −0.5 volt output signal which is insufficient to trigger amplifiers 85 and 88. The comparators will continue in this state so long as the voltage impressed at the terminal B is essentially the same as or more positive than the voltage impressed on the terminal A. When, however, the rotational velocity of the rear wheels becomes less than the rotational velocity of the front wheels, voltage impressed at the terminal 72B will become negative with respect to the voltage impressed at the terminal 72A. When this difference becomes more than four millivolts the comparator 72 generates the three volt signal to activate the power amplifier 85 and arcuate the solenoid 86 of the hold valve 87.

While the resistors 76 and 77 are of the same value the attenuator 79 is adjusted to that its output is more negative than that of the attenuator 80. The output signal of each of the attenuators is such that it is positive with respect to the reference voltage produced by the front wheel rectifier and filter units 60 and 62 when all of the vehicle wheels have the same rotational velocity.

If the velocity of the rear wheels is further decreased with respect to the velocity of the front wheels, the voltage differential across the terminals 78A and B of the second comparator will also reach a value of four millivolts or more to trigger the power amplifier 88 and actuate the solenoid 89 of the bleed valve 90. Since the attenuator 79 is initially adjusted so that its output is more negative than the output of the attenuator 80 a greater decrease in the rotational velocity of the rear wheels will be required to actuate the valve 90 than the valve 87, as will appear more fully below following the description of the valves 80 and 90 with particular reference to FIG. 3.

The hold and bleed air valves 87 and 90, shown separately in FIG. 2, are of identical construction and may be of any of several commercially available designs. They are normally spring urged to an open position in which the main air conduit 46 is placed in direct communication with the conduit 50 leading to the rear brakes through an internal passage 100 in the valve 87, a connecting air line 102 and an internal passage 104 in the valve 90. Thus, under normal operating conditions under routine or moderate braking operations the valves 87 and 90 have no effect on the brake application. However, if the applied braking effort for the given tractive road-wheel condition and dynamic load distribution becomes sufficiently high to reduce the velocity of the rear wheels as compared to the velocity of the front wheels by a predetermined amount, the solenoid 86 will shift the hold valve 87 to its second operating position in which the connection between the line 46 and the line 102 is interrupted, the latter being connected by an internal passage 106 to a plugged port 108. Thus, the holding valve 87 effectively isolates the rear wheel brakes from the valve 34. The braking pressure and consequently the braking force applied at each rear wheel is then held constant. If the differential velocity between the front and rear wheels is reduced, the solenoid 86 will be deenergized and the valve 87 will be returned to its normal position. On the other hand, if the velocity differential between the front and rear wheels increases, the solenoid 89 will be energized to shift the valve 90 to connect the pressurized air trapped within conduit 50 through a passage 110 to an exhaust orifice 112. The exhaust orifice 112 is relatively small, i.e. one-eighth inch so the pressurized air is allowed to bleed slowly thus reducing the braking effort at the rear wheels. The reduction in braking force will reduce the velocity differential between the front and rear wheels to a value insufficient to actuate the solenoid 89 and the system will then be returned to its "hold" mode of operation until load or traction conditions change or until the driver increases or decreases the braking action through the operation of valve 34.

To facilitate quick release of the brakes a bypass conduit 114 including a check valve 116 is provided which directly connects the conduits 46 and 50 bypassing both of the valves 87 and 90. Thus, when the operator releases the brakes the pressurized air in conduit 50 is freely vented regardless of the position of the valves 87 and 90. The check valve 116 prevents the passage of air from the conduit 46 to the conduit 50, so that air for brake application is always subject to the influence of the valves 87 and 90.

The foregoing description deals with the application of the control system of the present invention to a four-wheeled vehicle. However, the invention also has particular applicability to other types of vehicles having additional wheel sets, particularly to tractor-trailer combinations.

A brake system for application to a vehicle of this type is illustrated diagrammatically in FIG. 4. The control system for the tractor is essentially the same as the control system shown in FIG. 1. Accordingly, the same reference numerals are used where applicable, it being understood that the wheels 10 and 12 are to be considered the front wheels of the tractor and the wheels 14 and 16 the rear wheels of the tractor.

In a typical case the trailer will be a tandem axle unit, the front of the trailer being supported on a fifth wheel carried at the rear of the tractor. The trailer wheels are indicated at 114, 116, 118 and 120. Since the tractor-trailer combination is in all respects conventional it is not believed that a further illustration of the vehicle per se is required for present purposes. Also, for convenience the rectifier and filter units 60 and 62 and the rectifier and filter units 68 and 69 have been shown in a common housing and the attenuators 79 and 80, comparators and power amplifiers are understood to be included in the control unit 48.

To adapt the four-wheel system of FIG. 1 for the control of a tractor-trailer unit, it is necessary only to add one control unit 48a and the associated components for the tractor wheels. In as much as the wheels 114–120 of the conventional tandem axle trailer unit are subject to essentially the same braking forces, the same dynamic loads, the same road conditions, it is practical to treat the four wheels as one set for control purposes.

The air circuit is of essentially conventional form. Air is supplied by the engine driven compressor 26 to a trailer mounted reservoir 122 through a conduit 124, a tractor protection valve 126, a check valve 128, and a line 129. The tractor protection valve 126 is of conventional construction and seals off the emergency and service supply lines to the tractor in response to a manual triggering unit or automatically if the trailer is uncoupled, breaks away, or loses its service air supply. A conventional relay and lag valve 130 is also provided to eliminate the time lag otherwise associated with the operation of brakes which are physically remote from the application valve 34 and to supply automatically emergency air from the reservoir 122 in case of trailer breakaway. The brake assemblies 134, 136, 138 and 140 are connected to the outlet side of the application valve 34 by a conduit 142, valve 126, conduit 144, a valve 130, a conduit 146, normally open valves 87a and 90a and conduit 148 connected through the usual valves and fittings to the individual brake lines 149, 150, 152 and 154.

The trailer wheels are provided with transducers 156 which are the same as the transducers described in connection with FIG. 1. The four signals generated by the transducers are transmitted to a combination filter rectifier unit 158 which converts them to a single direct current output voltage signal, the level of which is indicative of the sum of the rotational velocities of the trailer wheels. The output of the unit 158 is connected by a lead 160 to the two attenuators (not shown) which are included within the control unit 48a.

As it is the rotational velocity of the front wheel set which serves as the reference against which the velocity of the trailer wheels is to be compared, the output signal of the rectifier and filter units 60, 62 is supplied to the control unit 48a through a lead 162 including an isolation resistor 164. Thus, the signal supplied to the control unit 48a from the front wheels is identical to the signal supplied to the primary control unit 48. Also, through circuitry not shown the control unit 48a is connected to the same power source as the control unit 48.

In similar manner, the system can be adapted to the control of additional wheel sets by simply extending the lead 162 and the associated power lines to one or more additional control units similar to the unit 48a.

The attenuator circuits of the control unit 48b may be set to have the same levels of sensitivity and response as are used in the control unit 48. It is also possible through empirical data to develop and utilize different "optimum" levels of sensitivity in each control unit for different types of vehicles to reflect the different dynamic load transfer characteristics developed by different weight and load conditions.

The operation of the systems of FIGS. 1 and 4 will now be considered in greater detail. As mentioned above, it is desired that the brakes be applied in such a manner that the vehicle stops in a minimum distance without loss of directional stability due either to loss of steering control or an uncontrollable skid. It is generally recognized that the braking force needed to produce this result is one that tends to cause the wheels to lock but which does not produce a locked wheel condition. Since road-tractive conditions change and dynamic load weight transfers accompany deceleration, it is apparent that the desired braking force must be variable rather than constant.

In the present system the braking force applied under the control of the vehicle operator is allowed to increase until the tendency of the rear wheels to lock up develops which reduces the rotational velocity of the rear wheels. At this point the maximum desirable braking force level has been achieved at the rear wheels. When the tendency of the rear wheels to lock up is noted under these conditions, the valve 87 or 87a is actuated to prevent the delivery of additional air pressure to the rear wheel brakes which would produce the undesired locked wheel condition. The response time of the system to the detected tendency toward rear wheel lockup is very short, for example, approximately 10 milliseconds. Thus, the system is effective to produce essentially the desired braking action for the conditions existing at the instant of actuation of the hold valve 87 or 87a. However, these factors vary continuously during a given braking action and the system thus continuously must monitor the effect of these factors upon the rotational velocity of the individual wheels and to vary the brake application force accordingly. Thus, if the forward dynamic weight shift is decreased or the coefficient of fiction between the vehicle tires and the road surface is increased, the differential velocity between the front wheels and the rear wheels will decrease indicating that the braking force is now inadequate. Under these conditions valves 87 or 87a will be deenergized and additional pressurized air will be allowed to flow to the rear wheel actuators until the new higher level of braking effort is achieved. Once again a level of braking effort is established which will assure minimum stopping distance without wheel lockup.

If, on the other hand, the unit is operating in the hold mode and the tire-road tractive condition or the dynamic load condition changes such that the tendency of the rear wheels to lock increases resulting in a greater speed differential between the front and rear wheels, the valves 90 or 90a will be energized since the control system has detected an excessive braking effort. The energization of the bleed valves 90 or 90a will decreases the braking force to reduce the tendency of rear wheels to lock up. As the differential between the speed of the front and rear wheels is diminished the level of sensitivity set by the attenuator 80 is no longer exceeded and the bleed valve solenoid 90 or 90a is deenergized returning the system to operation in the hold mode. It is to be understood that the position of the valve 87 has not been changed since operation of the valve 90 occurs only when the threshold of the attenuator 79 is also exceeded.

It is apparent that the operation of the bleed valve will prevent rear wheel lock as long as the front wheels are rolling.

It is important to note that in terms of braking efficiency the initial brake application is sufficiently to produce a tendency toward lockup at the rear wheels which is the desired braking condition. The optimum braking force is maintained by automatically increasing or decreasing the actual braking force to meet the constantly changing dynamic conditions. It is of particular importance that the level of braking effort never departs significantly from that which is regarded as optimum, i.e. the brakes are never released or pulsed. Thus under all conditions a high degree of braking efficiency is maintained with the consequence that stopping distances are held close to their practical minimums. This is not true in any other known antiskid brake system. Thus, the system effectively prevents both wheel lockup and partial or full brake release which characterizes all known prior systems.

It is to be noted that while the system of the present invention is designed to positively prevent rear wheel lockup there is one instance in which the rear wheels will be allowed to lock, i.e., when the front wheels lock first. In this instance it is desirable to produce a four wheel lockup. This is done in recognition of the fact that, on occasions, the matter of bringing the vehicle to a complete stop in the shortest possible distance is more important than permitting the driver to retain steering control. It is appreciated however that this will occur only in the most infrequent "panic" stop situations.

The rear wheel lockup is permitted after the front wheels have locked since the comparators 72 and 78 produce an operating output signal only when the rotational velocity of the front wheels exceeds that of the rear wheels which cannot occur when the front wheels are locked. Thus, when the front wheels are locked both valves 87 and 90 will be open permitting the application of full braking pressure to the rear wheel actuators. While the four wheel lockup may result In skidding, the vehicle will travel in an essentially straight line. In certain prior systems the four wheel lockup condition produces an automatic release of the brakes with the result that while the driver has retained directional control he has lost effective braking control.

The performance of the control system of FIG. 4 has been actual tests, the results of which are shown in charts. A and B of FIG. 5, chart A showing the operation of a tractor-trailer vehicle without the present system and chart B illustrating the operation of the unit equipped with the control system of FIG. 4.

In each of the charts the curve A is the pressure vs. time curve for the brake actuators of the front wheels and curves B and C indicate the corresponding operation of the brakes at the tractor rear wheels and the trailer tandem wheel set, respectively. The curve D illustrated the degree of jackknifing of the trailer with respect to the tractor. In both tests the vehicle was braked to a stop from a speed of 35 miles an hour, the operator applying maximum brake pressure to duplicate a "panic stop" situation. The tests were conducted on an asphalt surface covered with a layer of approximately 0.2 inch of coarse sand to produce relatively poor tractive road conditions.

With particular reference to chart A, it will be apparent that the normal buildup of pressurized air within all of the brake actuators occurred within approximately four seconds of the initial brake application. The pressure in all of the brake actuators remained at its maximum value throughout the braking operation except for the slight decrease noted toward the end of the braking cycle which was occasioned when the operator momentarily reduced the applied pedal force, a normal reaction to the amount of jackknifing, 19°, which was precipitated during the simulated panic stop condition. The vehicle was brought to a stop within 77.4 feet after the brakes were applied by the operator as hard and as quickly as possible.

It will be noted that shortly after the full brake pressure was applied producing lockup of the wheels of the trailer, jackknifing began to appear which became aggravated as the braking action continued. In this case the driver was able to bring the vehicle to a complete stop in the minimum distance but only at the expense of sacrificing complete directional control of the vehicle.

As is apparent from Chart B, the system of the present invention operated to limit the brake force developed at the tractor rear wheels during the first portion of the braking operation. After that time essentially the full braking pressure was applied to the rear tractor wheels although no lockup was detected. It is believed that this result is occasioned by the forward dynamic weight transfer which tends to artificially load the rear tractor wheels while unweighting the trailer wheels. This is further evidenced by the continual adjustment of the braking force applied to the tractor wheels. The vehicle was brought to a stop with full control and no jackknifing. The actual stopping distance was 79.7 feet, as compared with the stopping distance of the same unit without the control system of 77.4 feet. The retention of full operator control and the elimination of jackknifing is thus accompanied by only an insignificant increase in stopping distance.

Additional tests conducted with tractor-trailers unladen and loaded on a variety of road conditions including dry asphalt, a light coating of sand on asphalt and a heavy coating of sand on asphalt indicate that under all conditions the vehicle equipped with the system of FIG. 4 was brought to a stop with a maximum of two degrees of jackknifing whereas 7° to 26° of jackknifing was produced under the same conditions but without the system of the present invention. In many cases the stopping distance of the vehicle equipped with the system of the present invention was less than the stopping distance of the conventionally controlled vehicle. In other cases the stopping distance of the system-equipped vehicle was insignificantly greater than the stopping distance of the conventionally controlled vehicle.

What I claim and desired to be secured by Letters Patent is:

1. In a vehicle brake system in which pressurized fluid is normally supplied from a pressure source to the brakes for front and rear vehicle wheel sets under operator control, means to modify the operator controlled fluid pressure supplied to the brakes of one of said wheel sets comprising, first means operable in response to a first predetermined decrease in the velocity of at least one of the wheels of said one set with respect to the velocity of at least one of the wheels of the other set to limit the fluid pressure applied to the brakes of said one wheel set, and second means operable in response to a second and greater decrease in the velocity of at least one of the wheels of said one set with respect to the velocity of at least one of the wheels of said other set to decrease the fluid pressure applied to the brakes of said one wheel set.

2. The brake system according to claim 1 wherein said first means includes a normally open valve interposed between said source and the brakes of said one wheel set, and means responsive to said first predetermined decrease in the velocity of the wheels of said one set with respect to the velocity of the wheels of said other set to close said valve.

3. The brake system according to claim 2 wherein said second means includes a bleed valve interposed between said normally open valve and the brakes of said one wheel set, and means responsive to said second greater decrease in the velocity of the wheels of said one set with respect to the velocity of the wheels of said other set to shift said bleed valve to reduce the pressure applied to the brakes of said one wheel set.

4. In a vehicle brake system in which pressurized fluid is normally supplied from a pressure source to the brakes for a front vehicle wheel set and at least one rear vehicle wheel set under the control of an operator, means to modify the operator controlled fluid pressure supplied to the brakes of one of said wheel sets comprising, means for generating a signal which is a function of the rotational velocity of at least one of the wheels of the other set, means for generating second and third signals each of which is proportional to the velocity of at least one of the wheels of said one set, means for detecting a difference between said first and second signals means for detecting a difference between first and third signals, means responsive to a predetermined detected difference between said first and second signals to limit the fluid pressure applied to the brakes of said one wheel set, and additional means operable in response to a predetermined detected difference between said first and third signals operable to decrease the fluid pressure applied to the brakes of said one wheel set.

5. The brake system according to claim 4 wherein said other wheel set is said front wheel set and said one wheel set is disposed rearwardly of said other wheel set.

6. The system according to claim 5 wherein said vehicle is a tractor-trailer and wherein said one wheel set and said other wheel set are both on the tractor.

7. The system according to claim 5 wherein the vehicle is a tractor-trailer and wherein said one wheel set is on the trailer and said other wheel set is on the tractor.

8. The system according to claim 4 wherein said vehicle is a tractor-trailer unit, wherein said other wheel set is a dirigible set at the front of the tractor, and wherein there are a pair of said rear wheel sets, one on said tractor and one on said trailer, and wherein there is a distinct one of said fluid pressure modifying means associated with each of said rear wheel sets, each operable to detect the velocity thereof relative to the velocity of said front wheel set and to independently control the fluid pressure applied to the brakes thereof in accord with the detected relative velocity.

9. In combination with a vehicle braking system having a source of fluid applied under pressure under operator control, selectively operable fluid pressure actuated brakes for a front wheel set and at least one rearwardly disposed wheel set, first and second conduit means connecting said source to the front and rear brakes, respectively, to transmit pressurized fluid from said source under operator control to said brakes, the improvement comprising, transducer means mounted adjacent to each wheel of said front and rearward wheel sets for generating first electrical signals each having a frequency proportional to the rotational velocity of the associated wheels, means for converting each of said first signals to proportionately variable amplitude second signals, first means for combining the two of said second signals indicative of the rotational velocity of the front wheels and for producing a first reference output which is representative of the rotational velocity of the front wheel set, second means for combining the two of said second signals indicative of the rotational velocity of the rear wheels and for producing second and third outputs of different magnitude and each indicative of the rotational velocity of the rear wheel set, means to compare said first and second outputs to produce a first control signal only when said second output differs from said first output by a predetermined amount, means to compare said first and third outputs to produce a second control signal only when said third output differs from said first output by a predetermined amount, first means responsive to said first control signal and operable during braking of all wheel sets to isolate said rear brakes from said fluid source and thereby hold constant the developed pressure within said brakes, and second means responsive to said second control signal and operable to reduce at a slow and controlled rate said developed pressure at said rear brakes.

10. In a vehicle brake system in which the brakes for a forward vehicle wheel set and at least one rearwardly disposed vehicle wheel set are energized by pressurized fluid normally supplied from a pressure source under the control of an operator, means to modify the operator controlled fluid pressure supplied to the brakes of one of said wheel sets comprising means for generating a signal which is a function solely of the rotational velocity of at least one of the wheels of the other set, means for generating a second and independent signal which is proportional only to the velocity of at least one of the wheels of said one set, comparator means, means for feeding each of said signals, unmodified by the other, to said comparator means, said comparator means generating a control signal only when the speed of the wheel of the one set is less than the speed of the wheel of said other set, said comparator means being ineffective to generate a control signal when the speed of the wheel of said other set is equal to or less than the speed of the wheel of said one set, and means responsive to said control signal to prevent the application of further fluid pressure to the brakes of said one wheel set while maintaining the brakes of said one wheel set energized whenever the brakes of the other set are energized.

11. In a vehicle brake system in which pressurized fluid is normally supplied from a pressure source under operator control to the brakes for at least one wheel set of a vehicle having at least two wheel sets, means to modify the operator controlled fluid pressure supplied to the brakes of said one of said wheels comprising, first means operable during brake application to generate a first control signal in response to a first predetermined decrease in the velocity of at least one of the wheels of said one set with respect to the velocity of at least one of the wheels of another set and second means operable during brake application to generate a second control signal in response to a second and greater decrease in the velocity of at least one of the wheels of said one set with respect to the velocity of at least one of the wheels of another set and means responsive to the sequential generation of said first and second signals to decrease the fluid pressure applied to the brakes of said one wheel set.

12. In a vehicle brake system in which in its normal mode of operation pressurized fluid is supplied from a pressure source under operator control to actuate the brakes for at least one wheel set of a vehicle having at least two wheel sets, means to modify the operator's control of the fluid pressure supplied to the brakes of said one of said wheel sets comprising means for generating first and second wheel velocity indicative signals, means operative in response to said first and second signals for producing a first type of control signal when the magnitudes of said first and second wheel velocity indicative signals differ by a first amount and for producing a second and different type of control signal when the magnitudes of said first and second wheel velocity indicative signals differ by a second and different amount, means operative while the operator controlled fluid pressure is supplied to the brakes of said one wheel set and responsive to said first type of control signal to establish a first modified mode of operation of said brake system and responsive to said second type of control system for establishing a second modified mode of operation of said brake system.

PO-1050
(5/69)

UNITED STATES PATENT OFFICE
CERTIFICATE OF CORRECTION

Patent No. 3,602 553      Dated August 31, 1971

Inventor(s) JAMES C. CUMMING and JAMES C. NEISCH

It is certified that error appears in the above-identified patent and that said Letters Patent are hereby corrected as shown below:

On the face of the patent insert ---Assignee: North American Rockwell Corporation ---.

Column 1, line 2, change "Ser. No. 886,152" to read "Ser. No. 866,152".

Column 3, line 45, change "bed" to read "fed";

line line 49, change "compensator" to read "comparator";

line 73, change "ship" to read "chip".

Column 4, line 47, change "arcuate" to read "actuate".

Column 6, line 5, change "lag" to read "emergency".

Column 7, line 19, delete "will";

line 32, after "sufficiently" insert ---high---;

line 70, after "been" insert ---determined by---;

Column 8, line 5, change "illustrated" to read "illustrates";

line 43, change "tractor" to read "trailer";

Column 10, line 42, change "wheels" to read "wheel" and insert thereafter ---sets---.

Signed and sealed this 23rd day of May 1972.

(SEAL)
Attest:

EDWARD M. FLETCHER, JR.      ROBERT GOTTSCHALK
Attesting Officer              Commissioner of Patents